(12) United States Patent
Lee et al.

(10) Patent No.: US 7,020,113 B2
(45) Date of Patent: Mar. 28, 2006

(54) METHOD FOR ALLOCATING DEDICATED CHANNEL FOR TRANSMITTING PACKET IN CDMA MEDIA ACCESS CONTROL (MAC) LAYER CONTROL UNIT

(75) Inventors: Jai-Yong Lee, Ichon-shi (KR); Young-Jun Park, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 761 days.

(21) Appl. No.: 09/767,003

(22) Filed: Jan. 22, 2001

(65) Prior Publication Data

US 2001/0010687 A1 Aug. 2, 2001

(30) Foreign Application Priority Data

Jan. 25, 2000 (KR) ................................. 2000-3473

(51) Int. Cl.
*H04B 7/216* (2006.01)
(52) U.S. Cl. ..................................... 370/335; 370/441
(58) Field of Classification Search ............... 370/328, 370/329, 335, 338, 342, 401, 441, 349
See application file for complete search history.

(56) References Cited

U.S. PATENT DOCUMENTS

| | | | |
|---|---|---|---|
| 5,872,777 A | 2/1999 | Brailean et al. | 370/349 |
| 5,901,142 A | 5/1999 | Averbuch et al. | 370/329 |
| 6,002,677 A | 12/1999 | Javitt et al. | 370/329 |
| 6,038,223 A | 3/2000 | Hansson et al. | 370/329 |
| 6,052,369 A | 4/2000 | Hamalainen et al. | 370/389 |
| 6,078,577 A | 6/2000 | Bishop, Jr. et al. | 370/348 |
| 6,091,717 A | 7/2000 | Honkasalo et al. | 370/329 |
| 6,442,152 B1 * | 8/2002 | Park et al. | 370/341 |
| 6,473,419 B1 * | 10/2002 | Gray et al. | 370/349 |
| 6,519,266 B1 * | 2/2003 | Manning et al. | 370/469 |
| 6,621,809 B1 * | 9/2003 | Lee et al. | 370/335 |

* cited by examiner

*Primary Examiner*—Chau Nguyen
*Assistant Examiner*—Ian N. Moore
(74) *Attorney, Agent, or Firm*—McDonnell Boehnen Hulbert & Berghoff LLP

(57) ABSTRACT

A method for allocating a dedicated channel for transmitting a packet at a code division multiple access (CDMA) media access control (MAC) layer control unit to transmit a packet data between a mobile station (MS) and a base station (BS) in a CDMA mobile communication system including the MS and the BS, includes the steps of: when the packet is generated, by a MAC layer control unit of the MS, determining a service option of the packet; if the service option of the packet is link-oriented, requesting to allocate a dedicated control channel (DCCH) and receiving the DCCH; requesting to allocate a dedicated traffic channel (DTCH) and receiving the DTCH; and transmitting the packet via the DTCH.

8 Claims, 4 Drawing Sheets

METHOD FOR ALLOCATING DEDICATED CHANNEL FOR TRANSMITTING PACKET IN CDMA MEDIA ACCESS CONTROL (MAC) LAYER CONTROL UNIT

FIELD OF THE INVENTION

This invention relates to a data transmission between a mobile station and a base station in a code division multiple access (CDMA) mobile communication system; and more particularly, to a method for allocating a dedicated channel used for transmitting a packet at a CDMA media access control (MAC) layer control unit, upon transmitting a packet data between the mobile station and the base station in the CDMA mobile communication system.

DESCRIPTION OF THE PRIOR ART

A conventional radio data service is provided, based on a circuit switching and accordingly, a way of providing a data traffic service is equal to that of a voice traffic service. An advantage in case of using the way is that a delay time is short, however, there is caused a problem that an efficiency of a radio resource is very low and the variation of a packet is deadly low, because a channel is long time occupied for a data call in a data service like in a voice service. Especially, to maintain the channel in a code division multiple access (CDMA) mobile communication system, powers are dissipated more than needed, to thereby cause to drop a performance quality of an overall system.

SUMMARY OF THE INVENTION

It is an object of the present invention to provide a method for allocating a dedicated channel used for transmitting a data packet in order to increase an efficiency of a radio resource when transmitting a packet data between a mobile station (MS) and a base station (BS) in a CDMA mobile communication system.

In accordance with an aspect of the present invention, there is provided a method for allocating the dedicated channel for transmitting the packet at the MAC layer control unit to transmit the packet data between the MS and the BS in the CDMA mobile communication system including the MS and the BS, the method including the steps of: when the packet is generated, determining a service option of the packet; if the service option of the packet is link-oriented, requesting to allocate a dedicated control channel (DCCH) and receiving the DCCH; requesting to allocate a dedicated traffic channel (DTCH) and receiving the DTCH; and transmitting the packet via the DTCH.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
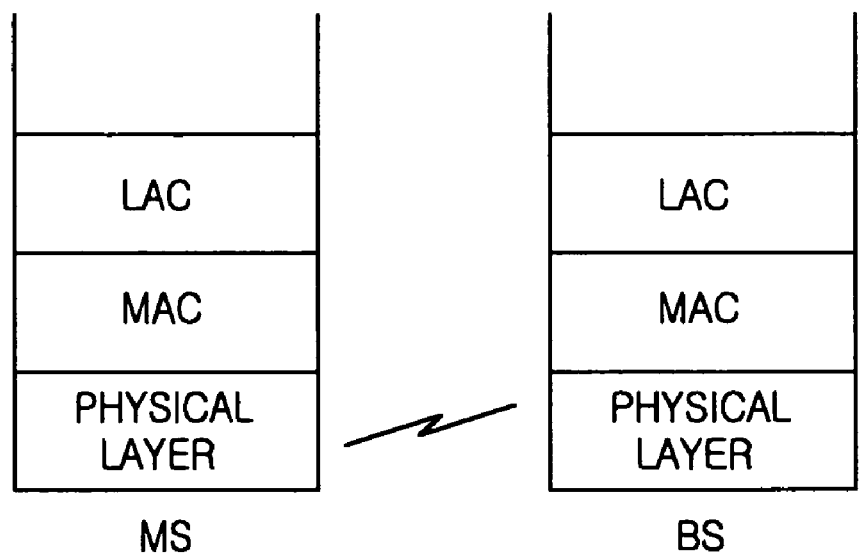
FIG. 1 shows a structure of a lowered CDMA protocol layer stack between a mobile station (MS) and a base station (BS) in a code division multiple access (CDMA) mobile communication system in accordance with the present invention.

FIG. 1 shows a structure of lowered CDMA protocol layer stacks between a mobile station (MS) and a base station (BS) in a code division multiple access (CDMA) mobile communication system in accordance with the present invention.

As shown in FIG. 1, a CDMA radio interface between the MS and the BS is controlled by physical layer protocol entities of both the MS and the BS. A media access is controlled by a media access control (MAC) layer protocol entity and a link access is controlled by a link access control (LAC) layer protocol entity.

The physical, MAC and LAC layer protocol entities are included in each of the MS and the BS.

Figure 2:
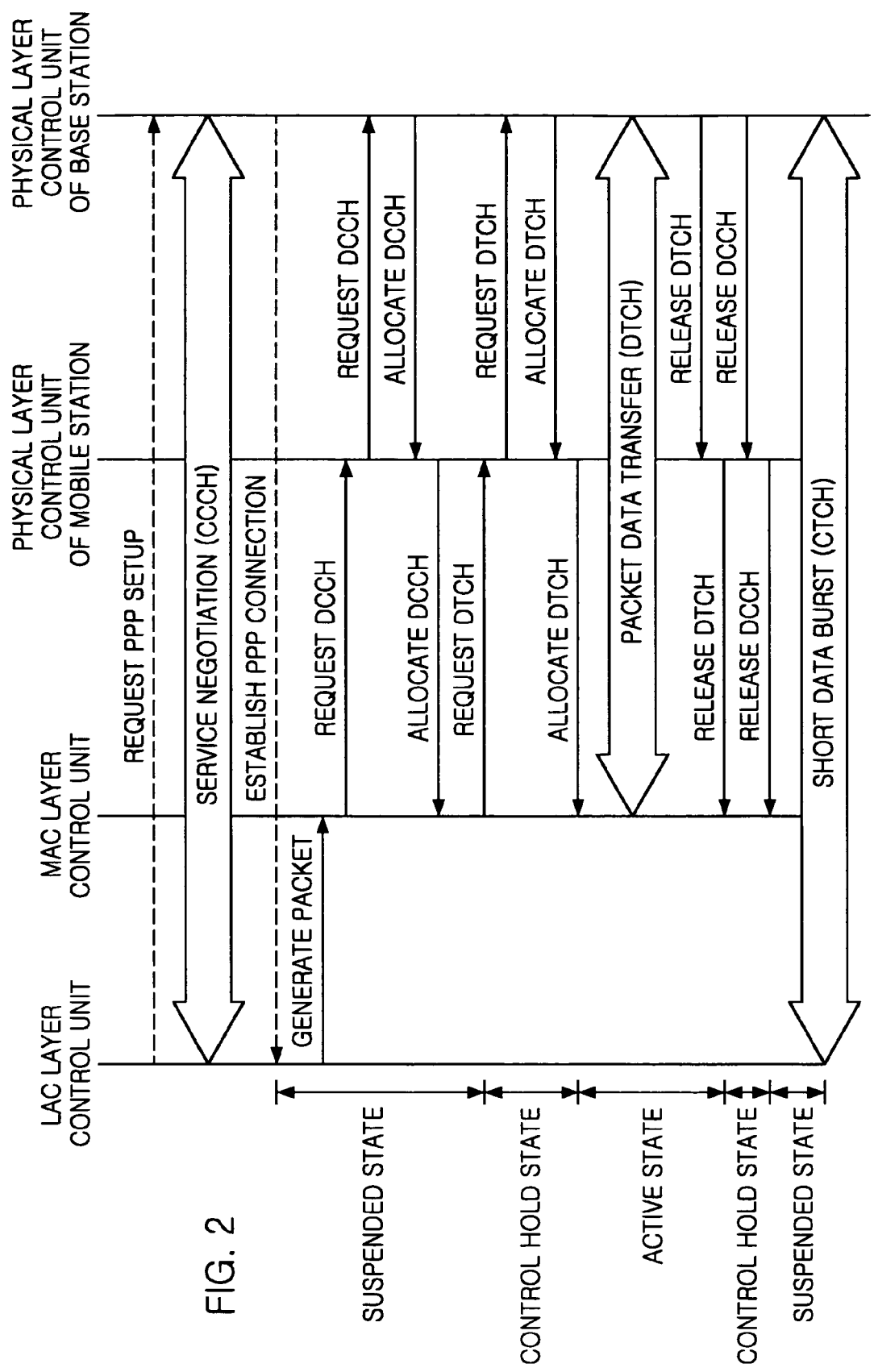
FIG. 2 is a flow chart illustrating operations between layer control units, each protocol entity of which performs corresponding functions in accordance with the present invention.

FIG. 2 is a flow chart illustrating operations between layer control units, each protocol entity of which performs corresponding functions.

As shown in FIG. 2, a physical layer control unit is an apparatus for performing a function of a physical layer. A MAC layer control unit is an apparatus for performing a function of a MAC layer. A LAC layer control unit is an apparatus for performing a function of a LAC layer.

Figure 3:
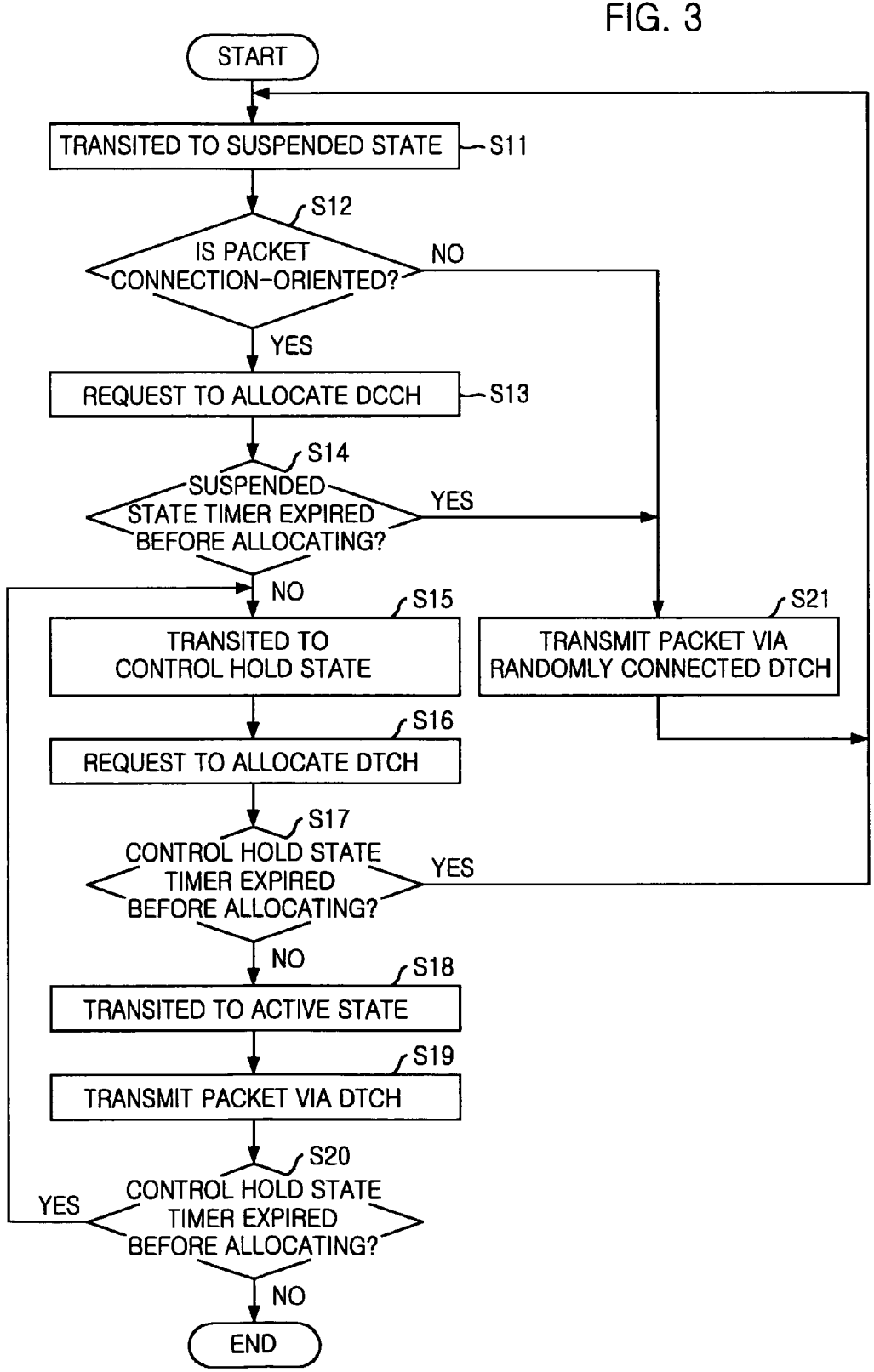
FIG. 3 is a flow chart illustrating a method for allocating a dedicated channel for transmitting a packet in a MAC layer control unit in accordance with the present invention.

FIG. 3 is a flow chart illustrating a method for allocating a dedicated channel for transmitting a packet in a MAC layer control unit in accordance with the present invention.

Referring to FIG. 3, when a packet is generated, at step S11, a MAC layer control unit of a mobile station (MS) is transited to a suspended state and, at step S12, determines a service option of the packet.

As a result of the determination, if the packet is a packet data mode service, at step S13, the MS requests a MAC layer control unit of a base station (BS) to allocate a dedicated control channel (DCCH).

At step S14, it is determined if a suspended state timer is expired before the DCCH is allocated, and if not, the logic flow proceeds to step S15 where the MAC layer control unit of the MS is transited to a control hold state, otherwise the MAC layer control unit of the MS is transited to a dormant state.

At step S16, the MS requests the MAC layer control unit of the BS to allocate a dedicated traffic channel (DTCH).

At step S17, it is determined if a control hold state timer is expired before the dedicated traffic channel is allocated, and if not, the logic flow proceeds to step S18 where the MAC layer control unit of the MS is transited to an active state, otherwise the logic flow returns to the step S14.

At step S19, the MAC layer control unit of the MS transmits the packet via the allocated dedicated traffic channel. At step S17, it is determined if a control hold state timer is expired before the dedicated traffic channel is allocated, and if not, the logic flow proceeds to step S18 where the MAC layer control unit of the MS is transited to an active state, otherwise the logic flow returns to the step S14.

At step S20, it is determined if the active state timer is expired before the packet is transmitted, and if not, a procedure of transmitting the packet is completed, otherwise the logic flow returns to the step S15.

As the result of the determination at the above step S12, if the packet is unlink-oriented, at step S21, the MAC layer control unit of the MS transmits the packet via a common traffic channel which is randomly connected thereto.

Figure 4:
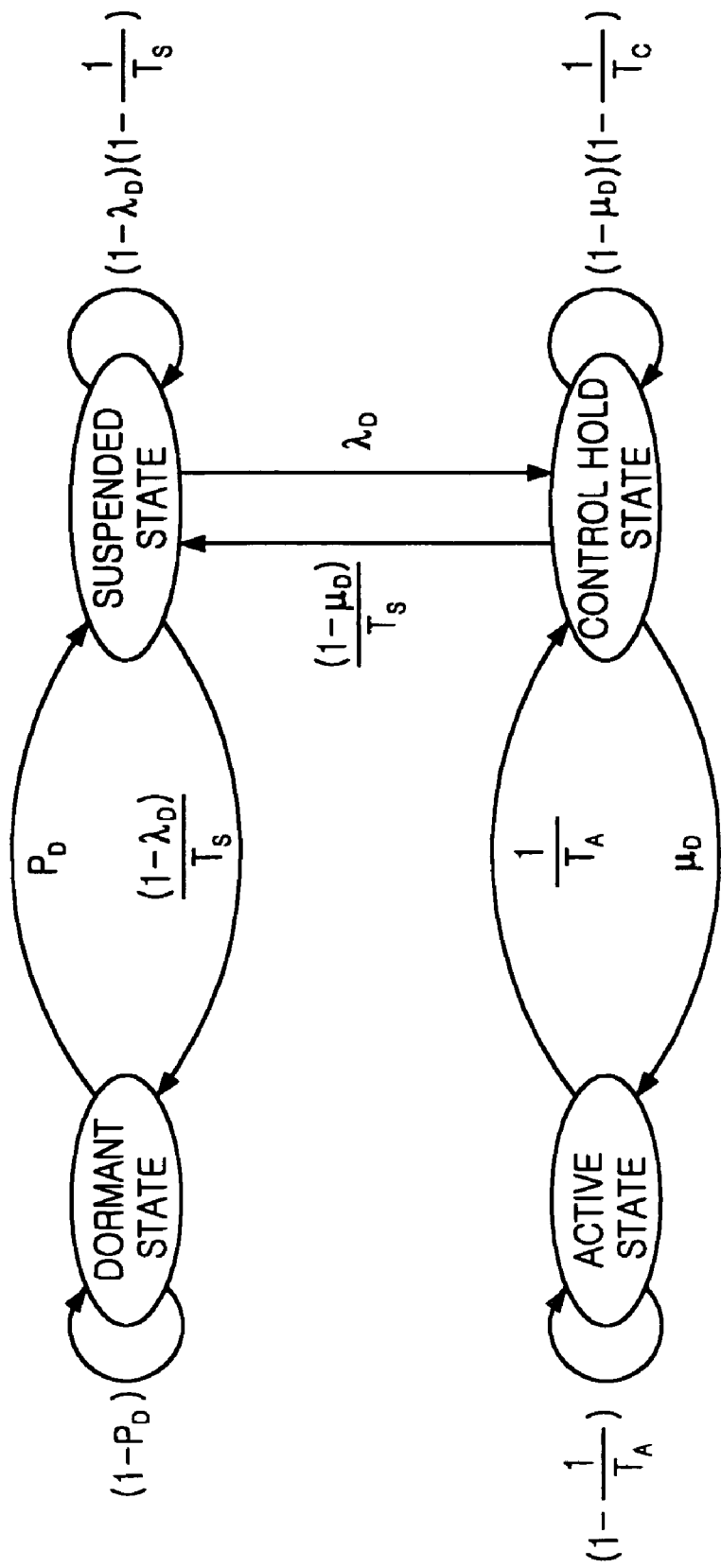
FIG. 4 is a flow chart illustrating a state transition of the MAC layer control unit in accordance with the present invention.

FIG. 4 is a flow chart illustrating a state transition of the MAC layer control unit.

Referring to FIG. 4, the MAC layer control unit can be operated in four types of state of a dormant state, a suspended state, a control hold state and an active state.

A dormant state refers to a state wherein the MS receives a pilot signal from the BS. At the dormant state, system information is not transmitted, so that a power control is not performed and quantity of dissipated powers is infinitesimal. An unlinked-oriented packet is transmitted randomly via the common traffic channel at the dormant state. In other words, a packet burst mode service is performed at this state. If a packet that requests a link-oriented service is generated, the MAC layer control unit is transited to the suspended state.

The suspended state refers to an initial state of data service mode wherein no dedicated channels (the dedicated control channel or the dedicated traffic channel) are allocated yet.

After the MAC layer control unit is transited to the suspended state, allocating the dedicated control channel is performed. If the suspended state timer is expired before the dedicated control channel is allocated, the MAC layer control unit is transited back to the dormant state. The MAC layer control unit is not transited to the control hold state until the dedicated control channel is allocated. The control hold state is kept up until the dedicated traffic channel is allocated after the dedicated control channel is allocated.

As the dedicated traffic channel is allocated to the packet, the MAC layer control unit is transited to the active state. However, if the control hold state timer is expired before the dedicated traffic channel is allocated, the MAC layer control unit is transited back to the suspended state.

In the active state, the packet of the data service mode is transmitted via the dedicated traffic channel allocated to the packet. Quantity of powers dissipates in the active state is lager than that of the other three states. The transmission of the packet should be completed before an active state timer is expired. As the active state timer is expired, the MAC layer control unit is transited back to the control hold state.

An equation for a probability ($\lambda$D) that the packet will be generated in the data service mode is represented as follows:

$\lambda_D = \lambda \times P_D$, where $\lambda$ denotes a probability that a link-oriented packet data requesting a packet data service mode will be generated and $P_D$ denotes a probability that the packet will be generated at the MAC layer control unit.

If the packet is generated in the probability of the $\lambda_D$, the MAC layer control unit of the MS determines a service option of the packet. If the packet is link-oriented, the MAC layer control unit at the suspended state, requests the MAC layer control unit of the BS to allocate the dedicated control channel via a physical layer of the MS.

As the dedicated control channel (DCCH) is allocated, the MAC layer control unit is transited to the control hold state and then the dedicated traffic channel is allocated in a probability of $\mu_D$ where the $\mu_D$ denotes a request rate of the DCCH. As the dedicated traffic channel is allocated, the MAC layer control unit is transited to the active state and transmits the packet via the allocated dedicated traffic channel.

During a $T_A$, the packet is transmitted at the active state and, as the $T_A$ elapsed, the MAC layer control unit is transited back to the control hold state. The above $T_A$ denotes a value of a system timer at the active state.

Then, it is determined if a $T_C$ elapsed, and if the $T_C$ elapsed as the dedicated traffic channel is not allocated, the MAC layer control unit is transited to the suspended state. The $T_C$ denotes a value of the system timer at the control hold state.

As the MAC layer control unit is transited to the suspended state, it is determined if a $T_S$ elapsed, and if the $T_S$ elapsed as the dedicated control channel is not allocated, the MAC layer control unit is transited from the suspended state to the dormant state. The $T_S$ denotes a value of the system timer at the suspended state.

At the dormant state wherein the packet burst mode service is performed, two types of state transition can be assumed. One type is a retransition to a first self-state, that is, a state where the packet burst mode is kept and the other type is a transition to the suspended state, that is, a transition to the data service mode. A probability of transiting to the data service mode is equal to the $P_D$. Immediately the link-oriented packet is generated, the MAC layer control unit is transited to the data service mode. Accordingly, a probability of transiting to the first self-state is equal to $(1-P_D)$, that is, a probability that an unlink-oriented packet will be generated. If the unlink-oriented packet is generated, the MAC layer control unit remains being at the packet burst mode.

At the suspended state, three types of state transition can be assumed. One type is a transition to the control hold state which happens as the dedicated control channel is allocated in the probability of the $\lambda_D$. Other two types are a retransition to a second self-state, that is, the suspended state and a transition to the dormant state, respectively which happens as the dedicated control channel is not allocated.

Until the dedicated control channel is allocated, times corresponding to the $T_S$ that is the value of the suspended state timer, elapse. It is not until the $T_S$ elapses that the MAC layer control unit is transited to the dormant state. If the dedicated control channel is not allocated, the MAC layer control unit is transited to the dormant state one time per $1/T_S$ and a probability that the dedicated control channel will not be allocated is equal to $(1-\lambda_D)$. Accordingly, a probability of transiting to the dormant state is equal to $(1-\lambda_D)/T_S$, and also, a probability of retransiting to the second self-state is equal to (1–the probability that the dedicated control channel will not be allocated–probability of transiting to the dormant state), that is, $(1-\lambda_D)(1-1/T_S)$.

At the control hold state, three types of state transition can be assumed. One type is a transition to the active state which happens as the dedicated traffic channel is allocated in the probability of the $\mu_D$. Other two types are a retransition to a third self-state, that is, the control hold state and a transition to the suspended state, respectively which happen as the dedicated traffic channel is not allocated.

Until the dedicated traffic channel is allocated, times corresponding to the $T_C$ that is the value of the control hold state timer, elapse. It is not until the $T_C$ elapses that the MAC layer control unit is transited to the suspended state. If the dedicated traffic channel is not allocated, the MAC layer control unit is transited to the suspended state one time per $1/T_C$ and a probability that the dedicated traffic channel will not be allocated is equal to $(1-\mu_D)$. Accordingly, a probability of transiting to the suspended state is equal to $(1-\mu_D)/T_C$, and also, a probability of retransiting to the third self-state is equal to (1–the probability that the dedicated traffic channel will not be allocated–probability of transiting to the suspended state), that is, $(1-\mu_D)(1-1/T_C)$.

As can be seen from described above, it is possible to maintain a speed of processing the packet irrespective of whether quantity of the generated packet is increased or not by allocating the dedicated channel to each link-oriented packet in accordance with the present invention, upon transmitting the packet data between the MS and the BS.

In more detail, there is provided an advantage that when 100 users request the data service mode in a probability of 0.8, there is not a marked difference between the conventional method and the method in accordance with the present invention for transmitting the packet in terms of an average delay, but over 54% is always kept up irrespective of the quantity of the generated packet in terms of a process rate.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for transmitting a packet at a code division multiple access (CDMA) media access control (MAC) layer control unit, the packet data being transmitted between a mobile station (MS) and a base station (BS) in a CDMA mobile communication system including the MS and the BS, the method comprising the steps of:
   a) when the packet is generated, by a MAC layer control unit of the MS, determining a service option of the packet;
   b) if the service option of the packet is a packet burst mode service, transmitting the packet via a common traffic channel (CTCH), and if the service option of the packet is a packet data mode service, by the MAC layer control unit of the MS, requesting to allocate a dedicated control channel (DCCH), receiving the DCCH, requesting to allocate a dedicated traffic channel (DTCH), receiving the DTCH, and transmitting the packet via the DTCH; and
   c) if the DTCH is not allocated before a control hold state timer is expired, transiting the MAC layer control unit of the MS to a suspended state or to a control hold state, wherein a probability of transiting to the suspended state equals $(1-\mu_D)/Tc$ and a probability of transiting to the control hold state equals $(1-\mu_D)(1-(1/Tc))$ where the $\mu_D$ denotes a request rate of the DTCH and $T_C$ denotes a control hold state timer value.

2. The method as recited in claim 1, wherein the MAC layer control unit of the MS is transited to a suspended state, before determining the service option of the packet.

3. The method as recited in claim 1, wherein the MAC layer control unit of the MS requests a MAC layer control unit of the BS to allocate the DCCH.

4. The method as recited in claim 1, further comprising the step of:
   if the DCCH is allocated before a suspended state timer is expired, transiting the MAC layer control unit of the MS to a control hold state, before requesting the MAC layer control unit of the BS to allocate the DTCH.

5. The method as recited in claim 1, further comprising the step of:
   if the DTCH is allocated before a control hold state timer is expired, transiting the MAC layer control unit of the MS to an active state before transmitting the packet via the DTCH,
   transmitting the packet, before an active state timer is expired and
   after the active state timer is expired, transiting the MAC layer control unit of the MS to the control hold state.

6. The method as recited in claim 4, further comprising the step of:
   if the DCCH is not allocated before a suspended state timer is expired, transiting the MAC layer control unit of the MS to a dormant state or back to the suspended state.

7. A method for transmitting a packet at a code division multiple access (CDMA) media access control (MAC) layer control unit to transmit a packet data between a mobile station (MS) and a base station (BS) in a CDMA mobile communication system including the MS and the BS, the method comprising the steps of:
   a) when the packet is generated, by a MAC layer control unit of the MS, determining a service option of the packet;
   b) if the service option of the packet is a packet burst mode service, transmitting the packet via a common traffic channel (CTCH), and if the service option of the packet is a packet data mode service, by the MAC layer control unit of the MS, requesting to allocate a dedicated control channel (DCCH), receiving the DCCH, requesting to allocate a dedicated traffic channel (DTCH), receiving the DTCH, and transmitting the packet via the DTCH;
   c) if the DTCH is allocated before a control hold state timer is expired, (i) transiting the MAC layer control unit of the MS to an active state before transmitting the packet via the DTCH, (ii) transmitting the packet, before an active state timer is expired and (iii) after the active state timer is expired, transiting the MAC layer control unit of the MS to a control hold state; and
   d) if the DTCH is not allocated before a control hold state timer is expired, transiting the MAC layer control unit of the MS to a suspended state or back to a control hold state,
   wherein a probability of transiting to the suspended state equals $(1-\mu_D)/Tc$ and a probability of transiting back to the control hold state equals $(1-\mu_D)(1-(1/Tc))$ where the $\mu_D$ denotes a request rate of the DTCH and Tc denotes a control hold state timer value.

8. A method for transmitting a packet at a code division multiple access (CDMA) media access control (MAC) layer control unit to transmit a packet data between a mobile station (MS) and a base station (BS) in a CDMA mobile communication system including the MS and the BS, the method comprising the steps of:
   a) when the packet is generated, by a MAC layer control unit of the MS, determining a service option of the packet;
   b) if the service option of the packet is a packet burst mode service, transmitting the packet via a common traffic channel (CTCH), and if the service option of the packet is a packet data mode service, by the MAC layer control unit of the MS, requesting to allocate a dedicated control channel (DCCH), receiving the DCCH, requesting to allocate a dedicated traffic channel (DTCH), receiving the DTCH, and transmitting the packet via the DTCH;
   c) if the DCCH is allocated before a suspended state timer is expired, transiting the MAC layer control unit of the MS to a control hold state, before requesting the MAC layer control unit of the BS to allocate the DTCH; and
   d) if the DCCH is not allocated before a suspended state timer is expired, transiting the MAC layer control unit of the MS to a dormant state or back to a suspended state,
   wherein a probability of transiting to the dormant state equals $(1-\mu_D)/Ts$ and a probability of transiting back to the suspended state equals $(1-\mu_D)(1-(1/Ts))$ where the $\mu_D$ denotes a request rate of the DCCH and $T_S$ denotes a suspended state timer value.

* * * * *